US006907597B1

(12) United States Patent
Mamona et al.

(10) Patent No.: US 6,907,597 B1
(45) Date of Patent: Jun. 14, 2005

(54) METHOD AND APPARATUS FOR CONSTRUCTING AN EXECUTABLE PROGRAM IN MEMORY

(75) Inventors: Andrzej Mamona, Woodbridge (CA); Indra Laksono, Richmond Hill (CA)

(73) Assignee: ATI International SRL, Christchurch (BB)

(*) Notice: Subject to any disclaimer, the term of this patent is extended or adjusted under 35 U.S.C. 154(b) by 403 days.

(21) Appl. No.: 09/687,322

(22) Filed: Oct. 13, 2000

(51) Int. Cl.[7] .................................................. G06F 9/44
(52) U.S. Cl. .................................. 717/121; 712/1
(58) Field of Search ........................ 717/121, 124–125, 717/137, 106–107, 168–178; 712/1

(56) References Cited

U.S. PATENT DOCUMENTS

| | | | | |
|---|---|---|---|---|
| 5,247,683 A | * | 9/1993 | Holmes et al. | 709/221 |
| 5,481,713 A | * | 1/1996 | Wetmore et al. | 717/170 |
| 5,504,920 A | * | 4/1996 | Biggs et al. | 712/42 |
| 5,555,416 A | * | 9/1996 | Owens et al. | 717/178 |
| 5,715,463 A | * | 2/1998 | Merkin | 717/175 |
| 5,835,777 A | * | 11/1998 | Staelin | 717/175 |
| 5,860,012 A | * | 1/1999 | Luu | 717/175 |
| 5,870,610 A | * | 2/1999 | Beyda | 717/173 |
| 5,931,909 A | * | 8/1999 | Taylor | 709/221 |
| 5,963,743 A | * | 10/1999 | Amberg et al. | 717/174 |
| 6,023,585 A | * | 2/2000 | Perlman et al. | 717/178 |
| 6,105,122 A | * | 8/2000 | Muller et al. | 712/1 |
| 6,256,773 B1 | * | 7/2001 | Bowman-Amuah | 717/121 |
| 6,282,709 B1 | * | 8/2001 | Reha et al. | 717/175 |
| 6,282,711 B1 | * | 8/2001 | Halpern et al. | 717/175 |
| 6,301,707 B1 | * | 10/2001 | Carroll et al. | 717/177 |
| 6,334,213 B1 | * | 12/2001 | Li | 717/170 |
| 6,381,741 B1 | * | 4/2002 | Shaw | 717/168 |
| 6,418,555 B2 | * | 7/2002 | Mohammed | 717/169 |
| 6,496,979 B1 | * | 12/2002 | Chen et al. | 717/178 |
| 6,591,418 B2 | * | 7/2003 | Bryan et al. | 717/177 |
| 6,760,630 B2 | * | 7/2004 | Turnaus et al. | 700/18 |
| 6,775,829 B1 | * | 8/2004 | Kroening | 717/175 |
| 6,778,178 B1 | * | 8/2004 | Laksono et al. | 345/556 |
| 6,779,179 B1 | * | 8/2004 | Romm et al. | 717/178 |

OTHER PUBLICATIONS

Cesario et al, "Component based design approach for multicore SoCs", ACM DAC, pp 789–794, Jun. 10–14, 2002.*
Wang et al, "Synthesizing operating system based device drivers in embaded systems", AMC CODES, Oct. 1–3, 2003, pp 37–44.*
Render et al, "An object orienetd model of software confiquation management", ACM pp 127–139, 1991.*

* cited by examiner

Primary Examiner—Anil Khatri
(74) Attorney, Agent, or Firm—Vedder, Price, Kaufman & Kammholz, P.C.

(57) ABSTRACT

A method and apparatus for constructing an executable program, such as drivers in memory, obtains system configuration parameters and dynamically constructs driver code bundles from a set of code modules obtained from a library, based on the actual system configuration parameters. The set of code modules includes code modules associated with a plurality of system configuration parameters. One example of the system configuration parameter include static system configuration parameters such as in the case of a computer, a CPU type, clock speed and system memory size. Other actual system configuration parameters include dynamic configuration parameters which can be changed by the user. One example of a dynamic configuration parameter may be, for example, pixel depth and display screen resolution. After obtaining optimal system configuration depending upon a system's setting or configurations, dedicated code modules are used and stored in system memory or other suitable memory. Accordingly, optimal driver code is loaded at all times for a particular chip set and no unnecessary code is loaded from a CD ROM or other source.

15 Claims, 6 Drawing Sheets

METHOD AND APPARATUS FOR CONSTRUCTING AN EXECUTABLE PROGRAM IN MEMORY

FIELD OF THE INVENTION

The invention relates generally to methods and apparatus for constructing executable programs and more particularly to methods and apparatus for constructing executable programs, such as software drivers, in memory.

BACKGROUND OF THE INVENTION

Computers, Internet appliances, and other devices typically use software drivers that are executed by a host processor or peripheral processor, such as a graphics accelerator or any other suitable processing device. A driver, as used herein, includes, for example, a software driver that processes operating system requests or other suitable requests and programs hardware to perform operations. Typically, different software drivers are written so that they can be run by different system configurations. For example, computers may have differing manufacturer' central processing units with different hardware configurations such as system memory size, size and type of video memory, clock speed, and other system configurations. The software driver needs to decide the best path for its code to execute based on the type of CPU and hardware configuration that the driver is running on. This can help improve performance of the hardware for which the software driver is designed. Accordingly, it would be desirable to configure a software driver that can execute on a plurality of different devices so that differing software drivers need not be designed and stored for each different type of hardware configuration.

Typically, software drivers, such as display drivers and any other drivers, may be stored on a CD ROM and shipped to a customer. The CD ROM with the display driver, or any other suitable driver, may include a plurality of different drivers that are used for different hardware configurations. For example, one driver may be provided for a hardware configuration that uses a first CPU type at a first operating speed along with a graphics accelerator that operates at a specified speed, and a different driver for use with a different type of CPU operating at a different speed for a different version of the same or different graphics accelerator system. Accordingly, a different software driver is used for different hardware configurations for an Internet appliance or computer.

A challenge arises to design a software driver that provides a suitable speed of executing operations so that high system performance is perceived from the perspective of an application and a user. For example, in the case of a display driver, a display driver executes operations for a graphics accelerator to perform three dimensional image rendering by a video game application, or any other suitable application. The software display driver should execute quickly and therefore typically the shorter the code path, the faster the operation of the driver. Accordingly, it is desirable to provide a minimum number of decisions that the code has to make with the actual hardware configuration. For example, the graphics drawing capabilities may be different for different controller chips and differing CPU capabilities, memory types, etc. Each graphics chip may typically have its own software driver. Software drivers may be application program interfaces (APIs) or other software modules that have entry points in the code that the operating system calls to perform functions. For example, in the case of the display driver, the operating system may call the display driver to have a graphics accelerator, also known as a graphics controller, draw a line for display on a display device. A GDI typically defines code entry points.

Also, software drivers typically evolve from one generation of a product to another wherein additional coding is added to previous code. If the older code has software fixes for hardware problems, and later versions of the hardware are fixed, there is no need to execute old or unnecessary code since this takes additional and valuable processing time.

Therefore, a need exists for an executable program, such as a software driver, that drives a plurality of peripherals and can run more efficiently on a plurality of CPUs and host systems.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Figure 1:
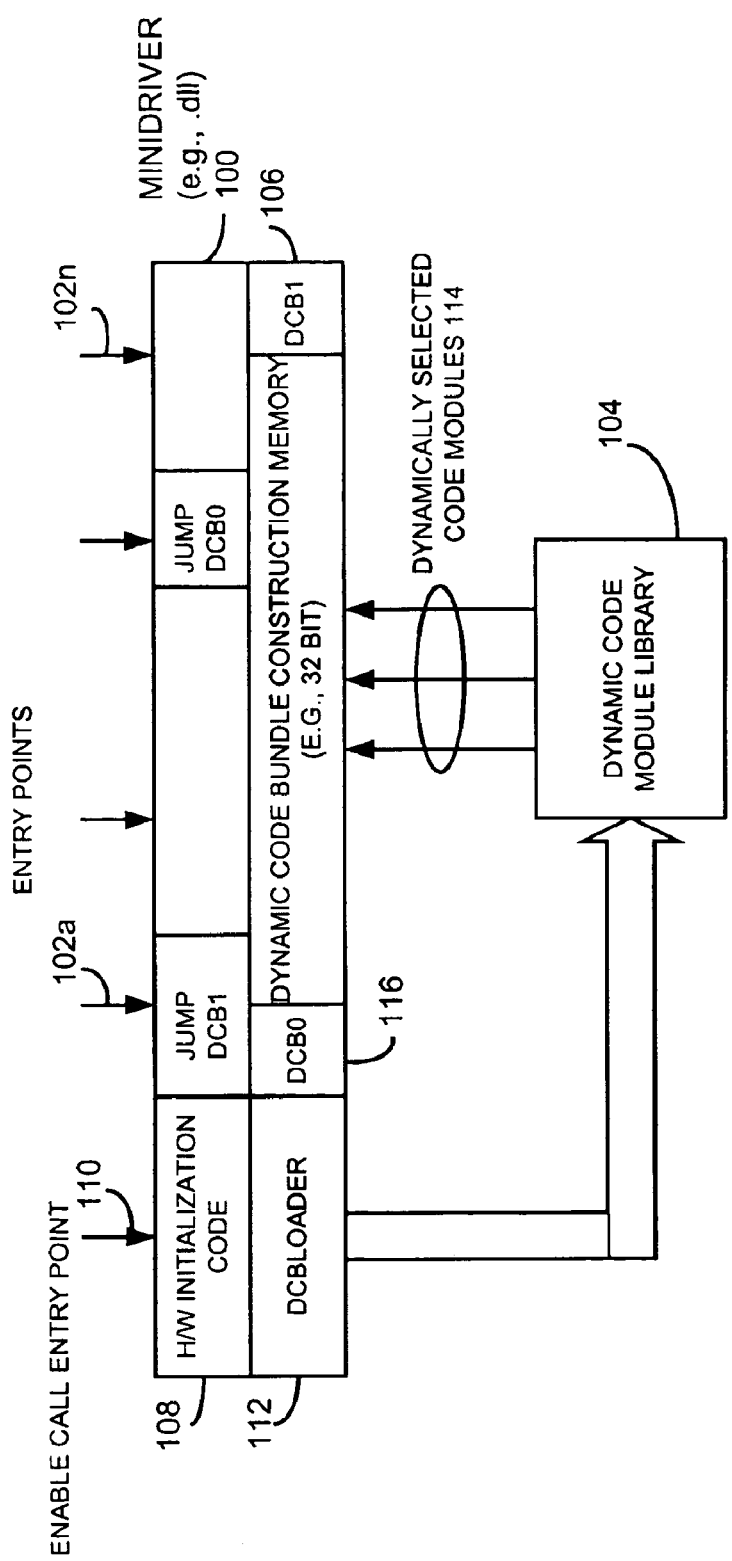
FIG. 1 is a block diagram illustrating software components AND MEMORY used to construct an executable program in accordance with one embodiment of the invention.

A method and apparatus for constructing an executable program, such as drivers, in memory includes obtaining actual dynamic and static system configuration parameters and dynamically constructing driver code bundles from a set of code modules obtained from a library, based on the actual system configuration parameters. The set of code modules includes code modules associated with a plurality of system configuration parameters. One example of the actual system configuration parameters includes static system configuration parameters such as in the case of a computer, a CPU type, clock speed and system memory size, graphic accelerator type and associated video memory size. Other actual system configuration parameters include dynamic configuration parameters which can be changed by the user or other application. One example of a dynamic configuration parameter may be, for example, pixel depth and display screen resolution. After obtaining optimal system configuration parameters depending upon a system's setting or configurations, dedicated code fragments such as code modules are used and stored in system memory or other suitable memory. Accordingly, optimal driver code is loaded at all times for a particular chip set and no unnecessary code is loaded from a CD ROM or other source. Since the code modules are selected based on a given set of configuration parameters an optimal driver is stored for a given system. The two types of actual system configuration parameters that determine a dynamic code bundle are the static, such as configuration parameters that never change during an operating session (hard ware configuration) and dynamic configuration parameters that depend, for example, on software configuration (system flags, pixel depth, screen resolution, etc.). The dynamic configuration parameters and the static system configuration parameters are stored and are used as a type of index to determine a set of code modules that are selected to define a code bundle. A different code bundle may be stored in memory depending upon different dynamic configuration parameter being selected.

In one embodiment, the method includes determining static system configuration parameters and storing static configuration parameters in driver memory (e.g., system memory where the driver is stored) for future use. The method also includes receiving a hardware enable call (through an enable call entry point) and obtaining dynamic configuration parameters associated with the hardware used by a software driver. The method also includes dynamically constructing code bundles for an actual system configuration based on the stored static and dynamic configuration parameters. The dynamic construction of code bundles is done for every entry point associated with a driver. For example, where the driver is a display driver, code bundles are dynamically constructed for each function associated with the display driver such as a draw circle function, draw line function, or any other defined function. The method also includes initializing the hardware, such as a graphics accelerator, by executing a constructed code bundle. The method also includes reconstructing a new code bundle after dynamic configuration parameter changes are detected. This may occur, for example, when a change in display screen resolution is selected by a user.

FIG. 1 diagramatically illustrates construction of an executable program in accordance with one embodiment of the invention. A mini-driver 100, such as a dynamic load library or other suitable code module, contains jump instructions for each function associated with a given software driver. Driver entry points 102a–102n, as known in the art, include an entry point for each function to be performed by an executable program, such as the software driver. By way of example, and not limitation, the disclosed invention will be described with reference to a display driver used, for example, to control a graphics controller (graphics accelerator) that performs, as known in the art, image rendering including the drawing of graphics such as circles, lines, graphic overlays, graphic user interfaces and/or three dimensional rendering. An application, such as a video game or other suitable application, calls the software driver to perform drawing of images to be displayed on a display device. A dynamic code bundle, in one example, defines a portion of a display software driver capable of assisting in rendering graphics for display on a display device. However, the invention may be applicable to any suitable driver.

Sets of code modules, referred to herein as dynamic code modules 104, are stored disk files that store code modules to be loaded in dynamic code bundle construction memory 106 to form dynamic code bundles 116. A single library file, for example, of dynamic code modules is dedicated for service of a particular function that is carried out by the driver, for example, a Bit BLT operation, as known in the art of display drivers, or a draw circle function, or any other suitable function. Hardware initialization code 108 is used to initialize hardware such as a graphics controller or other suitable hardware that is used by the driver. The hardware initialization code 108 includes an entry point 110 referred to as an enable call entry point. A dynamic code module loader 112, in response to the enable call to the hardware initialization code 108, searches the dynamic code modules 104 (libraries) and dynamically selects code modules 114 based on stored static and dynamic configuration parameters. Dynamic code bundle construction memory 106 is system memory allocated by the dynamic code module loader 112 where dynamic code bundles are formed by the dynamic code modules being loaded, linked and executed. Accordingly, dynamic code bundles are constructed during execution of the enable function which enables hardware that is used by the driver. The display driver passes control to the dynamic code module loader 112. The dynamic code module loader 112 may be a software module.

The mini-driver 100 may be a 16-bit .dll or any other suitable size or type of software code. Each and every entry point 102a–102n associated with a given driver (i.e., function of the driver) are patched with a jump instruction. Accordingly, the mini-driver 100 includes a jump instruction for each entry point of a display driver, for example.

The dynamic code bundle 116 may be located in a 32-bit code segment (or any size code segment) and consists of parts of a driver's code which vary depending upon the configuration of the hardware associated with the system. There are multiple entry points to the dynamic code bundle 116. If desired, the dynamic code bundle 116 may be implemented as standard .dll chosen depending upon system settings and loaded using load library.

The dynamic code module loader 112 selects which dynamic code modules are to be used for a given driver function based on static system configuration parameters and dynamic system configuration parameters and loads the individual code modules into dynamic code bundle construction memory 106 and performs the suitable linking of each of the individual code modules to generate a dynamic code bundle that serves as a type of independent code segment that is executed to carry out a defined function of a driver such as a draw line function, draw circle function, Bit BLT function or any other suitable display driver or non-display driver function.

Figure 2:
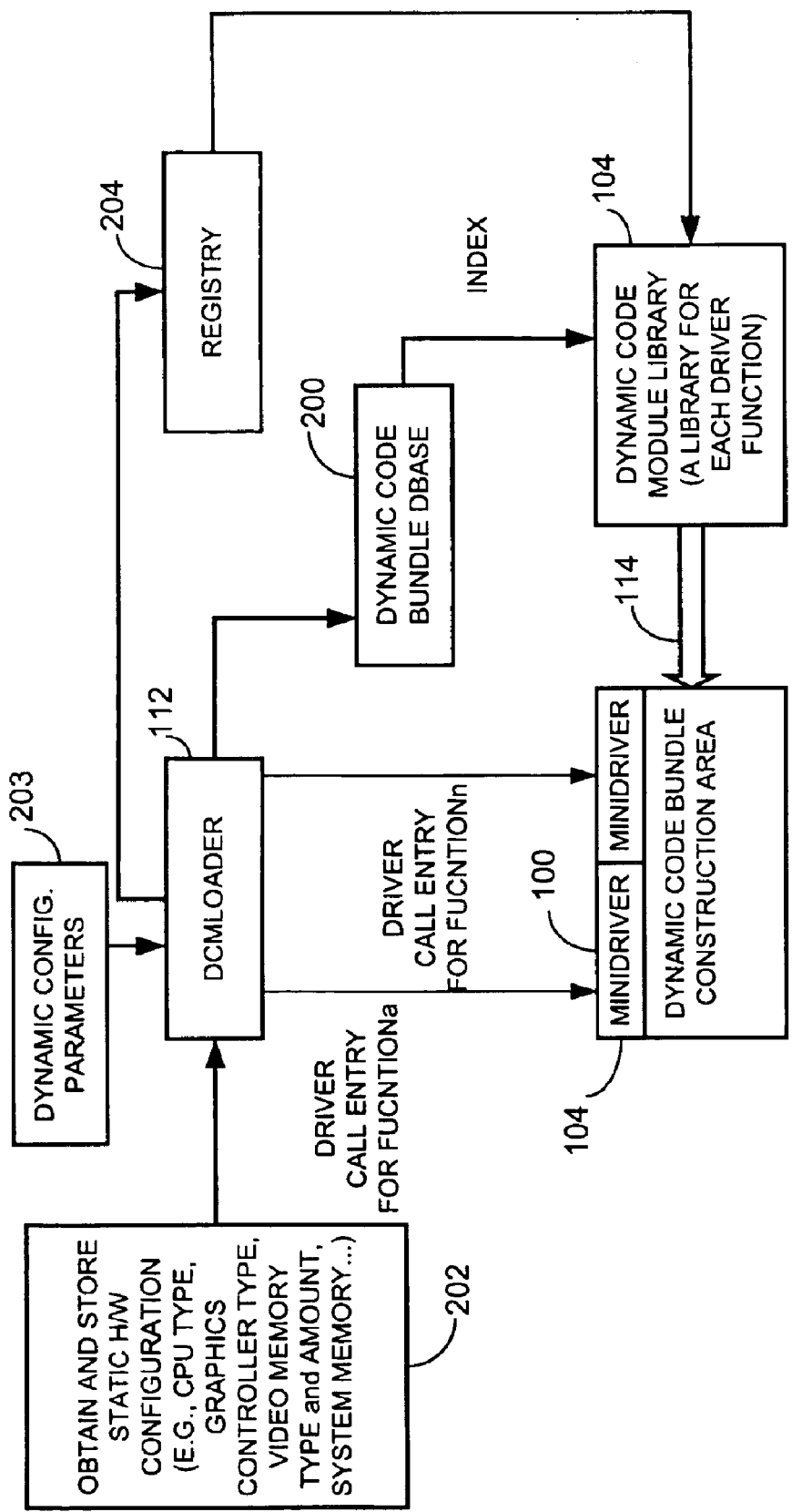
FIG. 2 is a block diagram representing one example of software blocks used in constructing an executable program in memory in accordance with one embodiment of the invention.
Figure 3:
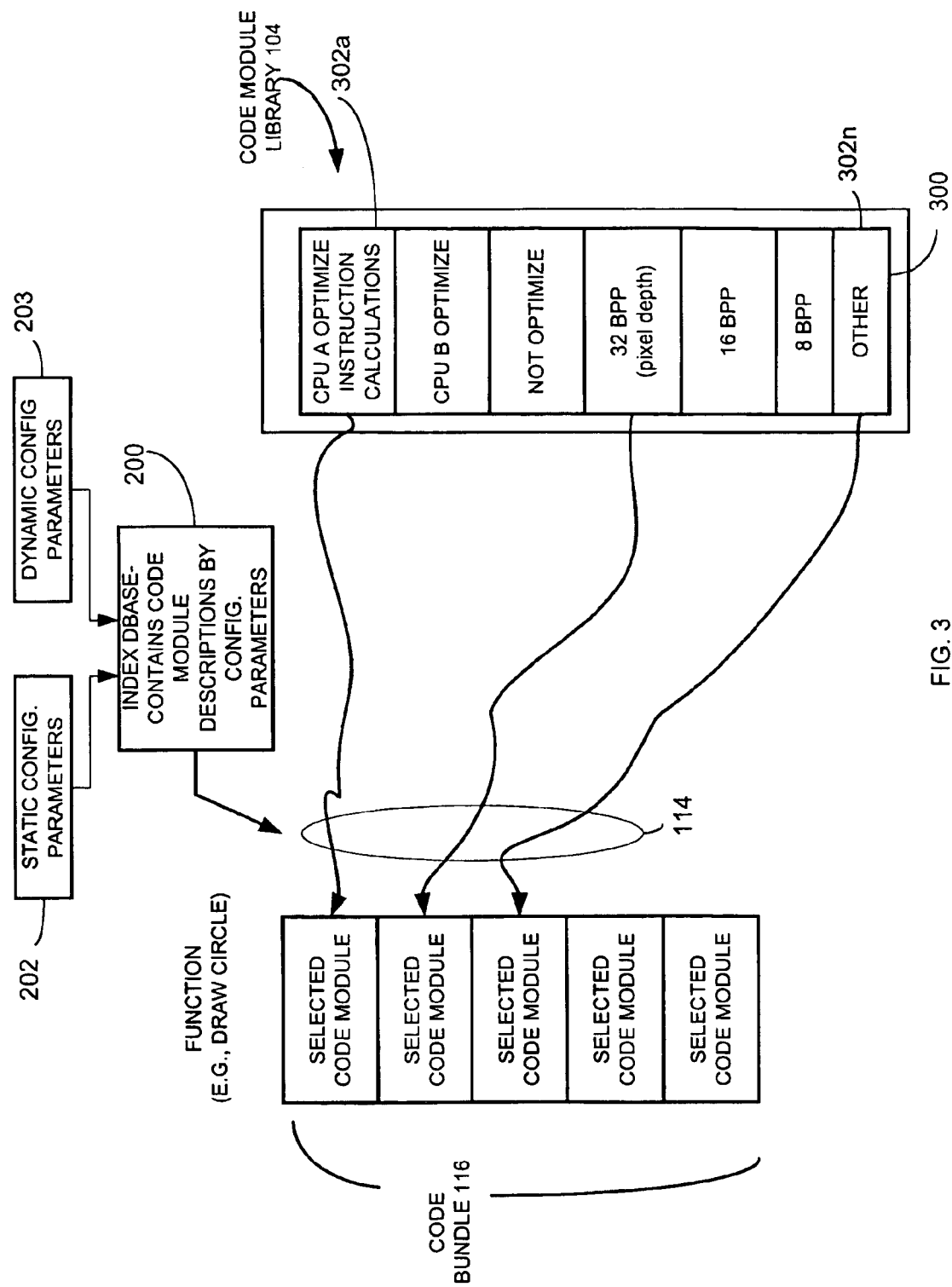
FIG. 3 is a block diagram illustrating a code module library and a code bundle in accordance with one embodiment of the invention.
Figure 4:
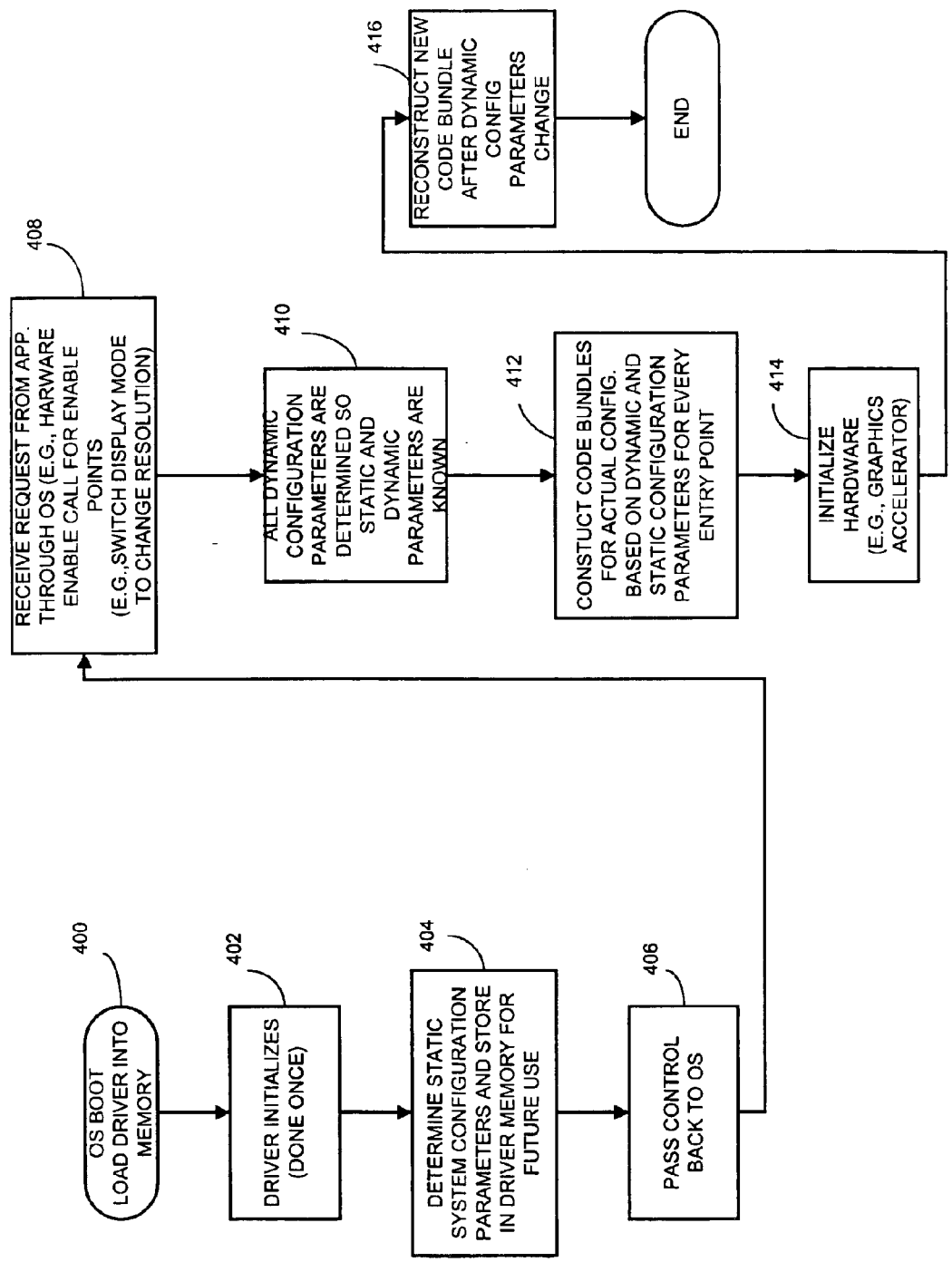
FIG. 4 is a flow chart illustrating one example of a method for constructing an executable program in memory in accordance with one embodiment of the invention.

Referring to FIGS. 2–4, a dynamic code bundle database 200 contains an index corresponding to actual system configuration parameters wherein actual system configuration parameters are associated with code modules stored in the dynamic code module library 104. For example, the dynamic code bundle database 200 has a collection of records describing relationships between code modules and a system configuration. Code modules are stored, on a per function basis, in the libraries in the dynamic code module library 104 as object modules. However, code modules may be defined in any other suitable way. Each of these code modules in a library has a certain record in the dynamic code bundle database. This record defines circumstances under which a particular code module should be loaded. Accordingly, the dynamic code bundle database 200 serves as an index database that contains code module descriptions by configuration parameters. For example, if a static system configuration indicated that the host CPU was an Intel Pentium®-based CPU with an optimized instruction set, a "CPU type" configuration parameter would be associated with a code module that was written in optimized instructions. For example, if a code module library was defined for the function of drawing a circle (see, e.g., FIG. 3), the code module library for drawing a circle may include a library of code modules that are written for differing CPU types and system memory size types. The dynamic code bundle database 200 includes a system parameter with associated code module identifiers to identify which code modules should be selected based on the particular configuration parameter. The Intel Pentium®-III supports new instructions that allows faster 4-way floating point operations. These new instructions can be loaded and linked and then executed as needed on a Pentium-III without the need of a conditional test and branch if the host machine is indeed running a Pentium-III CPU. The saving of this extra compare saves not only the potential loss of time from branch misprediction in all the entry points, it also decreases the memory footprint of loaded drivers from having to load the new and older code fragments in memory. This saving applies to all the code paths that may benefit from these new instructions. There are many other areas of potential factors that will affect the choice of code path. Examples include but are not limited to BUS type (as certain buses allow faster access to graphics video memory and change the optimal path to load texture data), System Memory type (as slower system memory may change the way operations are assembled in memory), and VideoMemory size (as more or less video memory may require some juggling of load balancing on which data stays in system memory and which is sent to video memory).

The dynamic code database may be defined a priori.

Referring to FIG. 4, a method for constructing executable programs, such as a driver, in system memory, is shown wherein an initial step includes an operating system booting to load the driver into memory, as shown in block 400. As shown in block 402, the driver initializes. As shown in block 404, the driver determines the static system configuration parameters of the system and stores the static actual system configuration parameter in driver memory for future use. This may be done, for example, by conventional methods, such as accessing an operating system file indicating the CPU type, memory size, and any other suitable static hardware system configuration information including the static system configuration associated with peripheral hardware, such as a graphics controller, video memory type, video memory quantity, graphics controller revision, system memory size and any other static system configuration parameters.

As shown in block 406, the driver passes control back to the operating system. As shown in block 408, the driver waits to receive a request from an application through the operating system such as a hardware enable. For example, the request may be to switch a display mode to change a screen resolution thereby changing dynamic system configurations. Accordingly, the pixel depth, for example, or other dynamic system configuration parameters, are then stored in driver memory, or any other suitable memory, for use by the dynamic code module loader to bundle the rest of the driver in a suitable manner. As shown in block 410, all dynamic configuration parameters are obtained so that at this point, the static and dynamic parameters are known and stored in driver memory. Accordingly, the driver obtains at least one actual system configuration parameter such as a static or dynamic system configuration parameter. Once the static and dynamic system configuration parameters are stored, the method includes dynamically constructing a driver code bundle for the actual system based on the dynamic and static configuration parameters, for every entry point associated with a defined function. This is shown in block 412. For example, the clipping code can be defined with the two versions: Pentium III and non-Pentium III, and note that the Pentium III code is loaded for Pentium III or better. This can provide potential savings. There is a potential savings from just 3 points (a single triangle) as that makes the potential branch misprediction to test Pentium III-flag much higher as a percentage of total time.

Accordingly, the method includes dynamically constructing a code bundle from a set of code modules, such as a library 300 (FIG. 3) of code modules 302*a*–302*n*. As shown in FIG. 3, a set of code modules 300 includes code modules associated with system configuration parameters such as whether a CPU-type utilizes optimized instruction calculations, and another code module associated with a different system configuration parameter, such as selected pixel depth which may be, for example, a dynamic configuration parameter. A code bundle (where it is necessary) can be dynamically constructed for every affected driver's entry point associated with the software driver. Once the code bundle has been constructed by loading the requisite code modules in the dynamic code bundle construction memory 106 the dynamic code bundle loader links each of the individual code bundles so that the code bundle is a sequence of instructions with suitable address links. Note that code fragments are written to reference only relative addresses of code and data, accordingly, the code can be moved into any desired position, without having to do fixups of absolute code and data addresses, since they do not exist in the code fragments.

As shown in block 414, once the code bundles are constructed, the driver initializes the hardware and as shown in block 416, a new code bundle will only be generated after a detected change in dynamic configuration factors. If a change is detected in dynamic configuration parameters, the dynamic code module loader will reconstruct a new code bundle for that given function consistent with the changed configuration parameters. For example, if a user again changes the resolution requirements for a display device, a new display function code bundle may be reconstructed.

Referring back to FIG. 2, the static hardware configuration may be stored in driver memory 202 and, if desired, a registry 204 may also be used to speed up the construction of a code bundle. For example, since code bundles are constructed during execution of an enable function, the driver passes control to the dynamic code module loader which recognizes the elements of the actual system environment by evaluating the stored static and dynamic configuration parameters. The registry 204 is updated during the user installation of a driver set. Alternately, a configuration optimizer can be optionally run by the user on each change to determine the new optimal registry configuration. The Registry 204 contains flags that define the optimal settings for what modules to load. The only flags that are typically used are the ones that affect optimal code execution. It does not contain critical flags for CPU type or any flag that could cause invalid code to be loaded (eg: PIII code loaded on PII CPU). The critical flags are determined on each bootup of the driver. If a registry search is successful, the dynamic code module loader simply configures the dynamic code bundle memory with code modules according to the list stored in the registry. Otherwise, it is necessary to review the dynamic code bundle database and store settings in the registry. For example,—for a given configuration, DCB settings are always the same, so indices are stored in a data base. It will be recognized that any other information that describes how bundles should be constructed can also be used. When an optimal setting cannot be determined, a general purpose non-optimal fallback code bundle can be loaded. This code bundle may contain all the tests and check to run from the fastest to the slowest systems. Alternately, it can simply contain the slowest code that works on all systems.

As shown in FIG. 3, each code bundle 116 includes a plurality of selected code modules 114. In response to storing dynamic configuration parameters, the driver, namely the dynamic code module loader, uses indexed code modules associated with the stored dynamic configuration parameters as defined in the dynamic code bundle database 200 to determine which code modules are selected to define a portion of a dynamic code bundle of the software driver.

Figure 5:
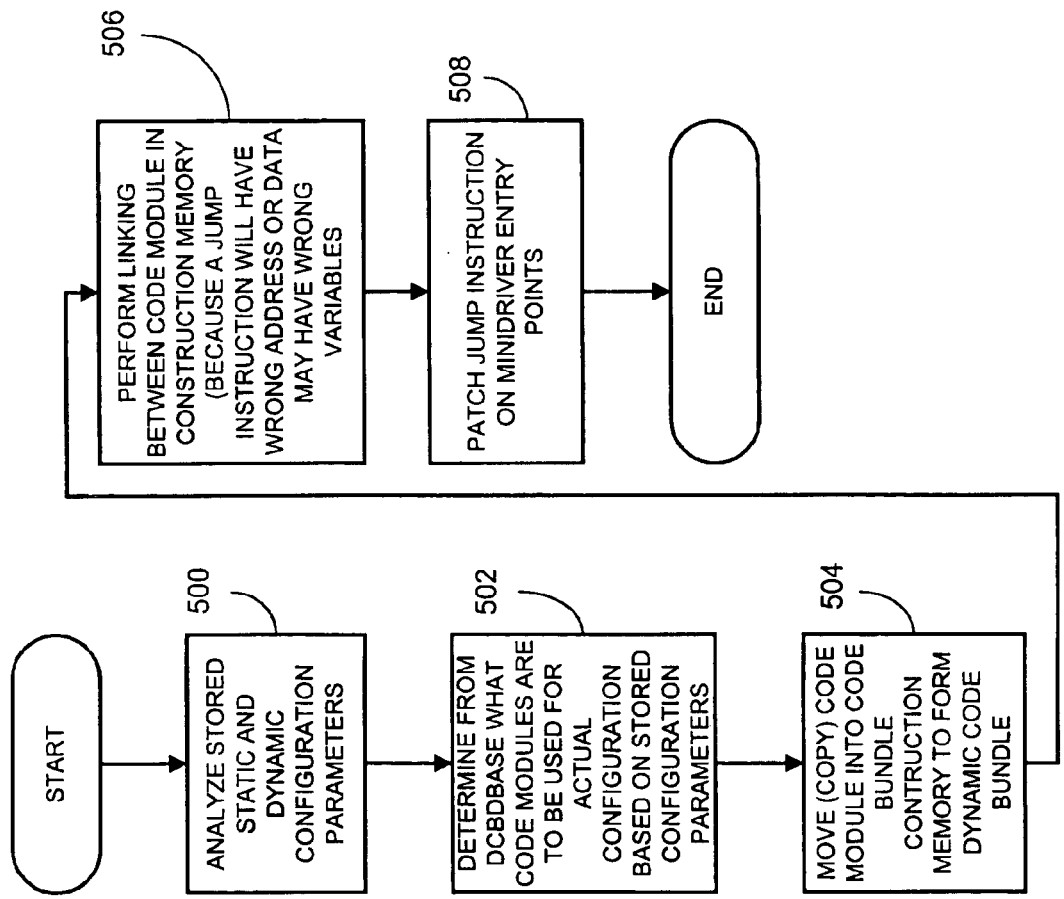
FIG. 5 is a flow chart illustrating one example of a method for constructing an executable program in memory in accordance with one embodiment of the invention.

FIG. 5 illustrates one example of the operation of the dynamic code module loader 112. As shown in block 500, the dynamic code module loader analyzes the stored static and dynamic configuration parameters 202 and 203. As shown in block 502, the dynamic code module loader determines from the dynamic code bundle database what code modules are to be used for the actual system configuration based on the stored dynamic and static configuration parameters.

The dynamic code module library 104 containing the plurality of code module libraries may be stored, for example, on a system's hard drive, if desired. In addition, the dynamic code bundle construction memory is preferably stored on a system hard drive. Typically, libraries of code bundles from removable medias like CDs or floppy disks may be stored to the hard drive, so these files would be accessible always when reconstruction of bundles is required. However it wil be recognized that source libraries may be obtained from other media including storage available via the Internet.

Figure 6:
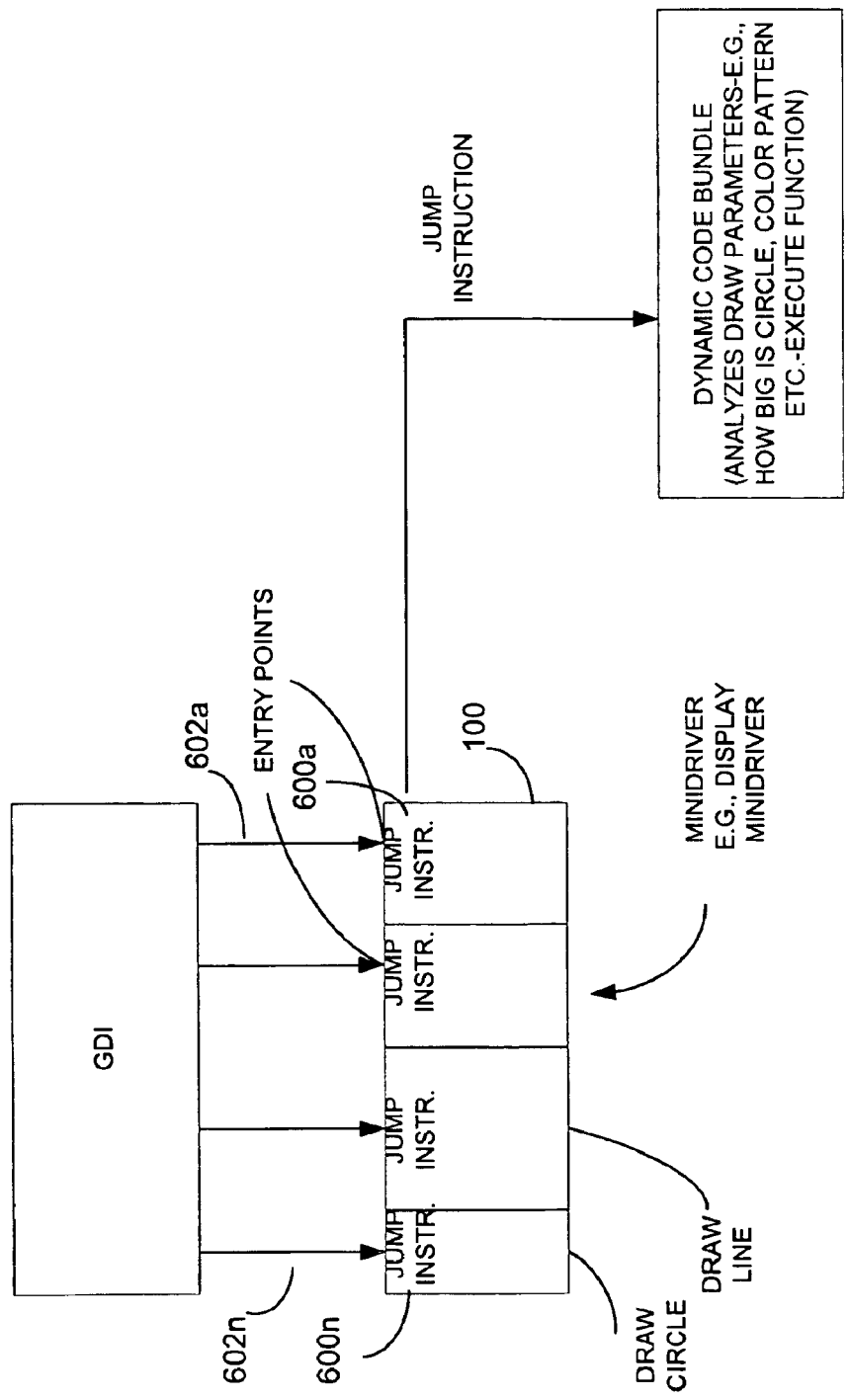
FIG. 6 is a graphic illustration of a mini-driver and jump instruction patching in accordance with one embodiment of the invention.

As shown in block 504, the dynamic code module loader moves a selected code module into the code bundle construction memory to form a dynamic code bundle. As shown in block 506, the dynamic code module loader performs linking between selected code modules in the construction memory. This occurs typically since a jump instruction that is included as part of an original code module may have the wrong address. Also, a variable included in the code module in the library may have wrong data and this information needs to be changed when it is linked with other code modules. As shown in block 506, once the linking—is complete, the dynamic code module loader patches a jump instruction in the mini-driver for entry points associated with the given function so that when the function is called, it jumps to the appropriate dynamic code bundle stored in the dynamic code bundle construction memory. Linking is a process of resolving external references between boundaries. During this process symbolic information, such as names of variables and/or labels in a code are being replaced by addresses of these objects, so the program can be executed FIG. 6 illustrates diagramatically the patched jump instructions 600a–600n which define the mini-driver 100 associated with the display driver. There is a jump instruction associated with each dynamic code bundle. Each dynamic code bundle, when executed, performs a given driver function, such as a draw circle function, draw line function or any other suitable function. Each jump instruction causes the processing device to jump to the appropriate dynamic code bundle which is then executed. A GDI, as known in the art, generates the calls 602a–602n to the entry points of the mini-driver 100 In the above example, a single minidriver with multiple entry points (functions) is used, but the method is applicable to any software module, and not necessarily a driver.

The above software may be stored, for example, on one or more storage mediums that contain executable instructions that when executed by one or more processing devices, causes the one or more processing devices to operate as described above. The storage medium may include a CD ROM, device (system) memory, RAM, server memory or any suitable memory. The disclosed driver architecture provides for only required software modules to be executed, thereby bypassing older sections of software that may no longer be applicable or software fixes that are no longer required to run in view of an improved version of hardware that has been detected through the configuration parameters. The dynamic code bundles are preferably but not necessarily loaded into RAM of the system. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for constructing a program in memory comprising the steps of:
    obtaining at least one actual system configuration parameter; and
    dynamically constructing at least one code bundle from a set of code modules based on the actual system configuration parameter that comprises at least a dynamic configuration parameter,
    wherein the set of code modules includes at least one code module associated with a first system configuration parameter and at least a second code module associated with a second system configuration parameter.

2. The method of claim 1 wherein the program is associated with a software driver and including the step of dynamically constructing a code bundle for every driver entry point associated with the software driver.

3. The method of claim 1 wherein the step of dynamically constructing the at least one code bundle includes adding at least one of a jump instruction and call instruction for every code bundle.

4. The method of claim 1 wherein each code bundle includes a plurality of code modules.

5. The method of claim 4 wherein the at least one actual system configuration parameter also includes at least a static system configuration parameter and wherein the method includes the step of storing the dynamic configuration parameter or the static system configuration parameter.

6. The method of claim 5 including the step of storing a library containing at least the set of code modules and storing a database containing at least an index corresponding to actual system configuration parameters wherein actual system configuration parameters are associated with at least one code module stored in the library and wherein the step of dynamically constructing at least one code bundle includes:
    in response to storing dynamic configuration parameters, using indexed code modules associated with the stored dynamic configuration parameters to determine which code modules are selected to define a portion of a software driver.

7. The method of claim 1 wherein the dynamic code bundle defines at least a portion of a display software driver capable of assisting in rendering graphics for display on a display device.

8. A storage device that contains programming instructions that when executed by one or more processing devices causes the one or more processing devices to:
    obtain at least one actual system configuration parameter; and
    dynamically construct at least one code bundle from a set of code modules based on the actual system configuration parameter that comprise at least a dynamic configuration parameter, wherein the set of code modules includes at least one code module associated with a first system configuration parameter and at least a second code module associated with a second system configuration parameter.

9. The storage device of claim 8 including stored programming instructions that when executed by one or more processing devices causes the one or more processing devices to dynamically construct a code bundle for every driver entry point associated with a software driver.

10. The storage device of claim 8 including stored programming instructions that when executed by one or more processing devices causes the one or more processing devices to dynamically construct the at least one code bundle by adding a jump instruction for every code bundle.

11. The storage device of claim 8 wherein each code bundle includes a plurality of code modules.

12. The storage device of claim 11 wherein the at least one actual system configuration parameter also includes at least one static system configuration parameter and wherein the storage device includes stored programming instructions that when executed by one or more processing devices causes the one or more processing devices to store the dynamic configuration parameter and the static system configuration parameter.

13. The storage device of claim 12 including stored programming instructions that when executed by one or more processing devices causes the one or more processing devices to store a library containing at least the set of code modules and store a database containing at least an index corresponding to actual system configuration parameters wherein actual system configuration parameters are associated with at least one code module stored in the library and in response to storing dynamic configuration parameters, using indexed code modules associated with the stored dynamic configuration parameters to determine which code modules are selected to define a portion of a software driver.

14. The storage device of claim 8 wherein the dynamic code bundle defines at least a portion of a display software driver capable of assisting in rendering graphics for display on a display device.

15. The method of claim 1 wherein the dynamic configuration parameter includes data representing at least one of: pixel depth and display screen resolution.

\* \* \* \* \*